United States Patent [19]
Marklund

[11] Patent Number: 4,779,836
[45] Date of Patent: Oct. 25, 1988

[54] VALVE ARRANGEMENT FOR CONTROLLING A PRESSURE MEDIUM FLOW THROUGH A LINE OF PRESSURE MEDIUM

[75] Inventor: Erland Marklund, Skellefteå , Sweden

[73] Assignee: Bahco Hydrauto AB, Skelleftea, Sweden

[21] Appl. No.: 9,333

[22] PCT Filed: Feb. 25, 1986

[86] PCT No.: PCT/SE86/00081

§ 371 Date: Dec. 23, 1986

§ 102(e) Date: Dec. 23, 1986

[87] PCT Pub. No.: WO86/04964

PCT Pub. Date: Aug. 28, 1986

[30] Foreign Application Priority Data

Feb. 26, 1985 [SE] Sweden ............................... 8500934

[51] Int. Cl.[4] ..................... F16K 31/122; F16K 31/02

[52] U.S. Cl. .......................................... 251/26; 91/33; 91/452; 251/30.02; 251/30.05; 251/44

[58] Field of Search ........................... 91/33, 433, 452; 60/413, 418; 137/459, 487.5, 596.13, 596.16; 251/26, 30.01, 30.02, 30.05, 44

[56] References Cited

U.S. PATENT DOCUMENTS

| | | | |
|---|---|---|---|
| 2,480,712 | 8/1949 | Carbon | 251/44 |
| 2,916,879 | 12/1959 | Gondek | 91/433 |
| 3,593,741 | 7/1971 | Odenthal et al. | 137/495 |
| 3,862,738 | 1/1975 | Stumpmeier | 251/26 |
| 3,892,381 | 7/1975 | Prescott et al. | 251/26 |
| 4,052,929 | 10/1977 | Baatrup et al. | 91/433 |
| 4,120,478 | 10/1978 | Hasegawa | 251/26 |
| 4,149,565 | 4/1979 | Jennings et al. | 251/26 |
| 4,206,688 | 6/1980 | Haak et al. | 91/452 |

FOREIGN PATENT DOCUMENTS

| | | | |
|---|---|---|---|
| 0051003 | 3/1982 | Japan | 91/452 |

*Primary Examiner*—George L. Walton
*Attorney, Agent, or Firm*—Cushman, Darby & Cushman

[57] ABSTRACT

Valve arrangement in a line with pressure medium used as supply and return line, said valve arrangement being intended for controlling the flow through said line and comprising a valve body with a first and a second valve port which serve, alternately, as input and output, and a valve cone arranged in the valve body which connects in its open position the valve ports with each other, closes these in its closed position and is actuated by a holding force which is greater than the force acting on the pressure medium side of the valve cone and dependent on the medium pressure in the input port. In order to permit a flow in either direction the valve ports (2,3) are connected to a space (17) through each their passage (19, 20) and a groove (18) serving as a variable restriction in the valve cone, each passage (19, 20) containing a valve (21, 22) which permits a flow from the valve ports (2, 3) and to the space (17) which, in turn, is associated with the valve ports through passages (23, 24; 23, 25) having each their valve (27;28) permitting a flow from the space and containing a control valve (26) before the last-mentioned valves in the direction of flow in order to open and block the flow from the space (17).

5 Claims, 2 Drawing Sheets

VALVE ARRANGEMENT FOR CONTROLLING A PRESSURE MEDIUM FLOW THROUGH A LINE OF PRESSURE MEDIUM

This invention relates to a valve arrangement intended to be disposed in a line with pressure medium which is used as supply line as well as return line, e.g. in a line of pressure medium connecting a pressure source, e.g. a pump, with a consuming device, e.g. a single-acting cylinder, another piston-cylinder arrangement with return strokes through spring force or another external or internal returning force or tank for control of the flow of pressure medium through said line with pressure medium, said valve arrangement comprising a valve body with a first valve port connected to the line with pressure medium and a second valve port connected to said line with the pressure medium, said valve ports, alternately, serving as input and output, and a valve cone arranged in the valve body and movable from a closed position, in which its closes the two valve ports, to an open position in which it connects the two valve ports with each other, the valve cone in its closed position being under the influence of a holding force acting on the side of the valve cone facing away from the valve ports, said holding force being greater than the force acting on the pressure medium side of the valve cone and dependent on the medium pressure in the valve port operating as input.

E.g. at single-acting hydraulic cylinders with return strokes provided by a spring or a load or the like acting on the cylinder or its piston rod the supply line for the pressure medium from the pressure source, as is well-known, is also used as return line for the pressure medium from the cylinder to a tank. There are different kinds of control valves for controlling the flow of pressure medium in such a line which valves permit a flow in one direction only and, for that reason, two such control valves shunted or connected in parallel are required in order that it might be possible to control the flow in one direction or the other in such a line with pressure medium serving as supply as well as return line.

It is therefore the object of this invention to provide a valve arrangement so constituted that it enables control of the flow of pressure medium in one direction or the other in a line with pressure medium serving as supply as well as return line between a pressure source and a consuming device and which, moreover, shall have a simple and reliable function and, further, should enable control of the amount of pressure medium per time unit.

This object of the invention is achieved by a valve arrangement according to the invention having the characteristic features defined in the claims.

Figure 1:
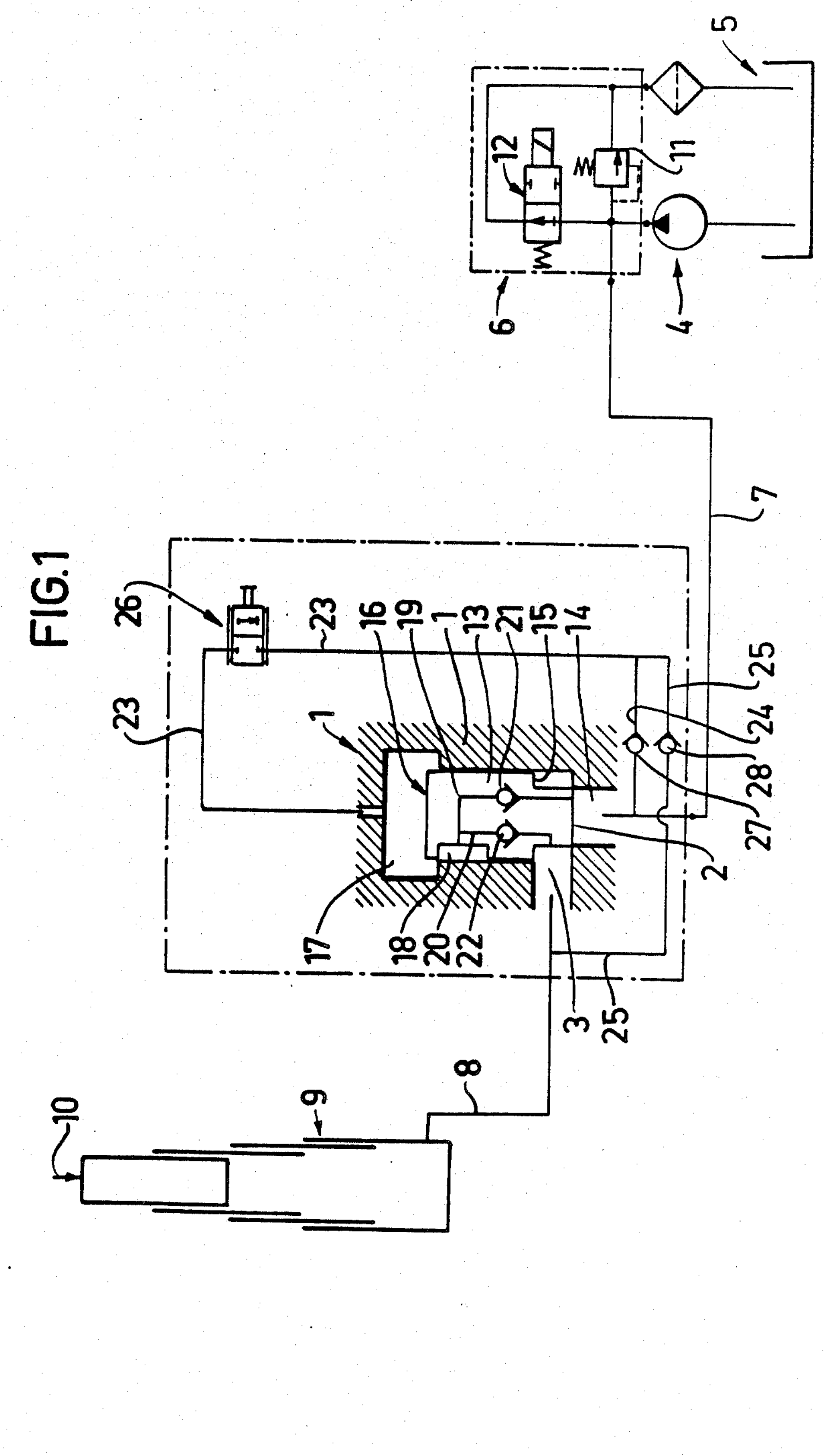
Figure 2:
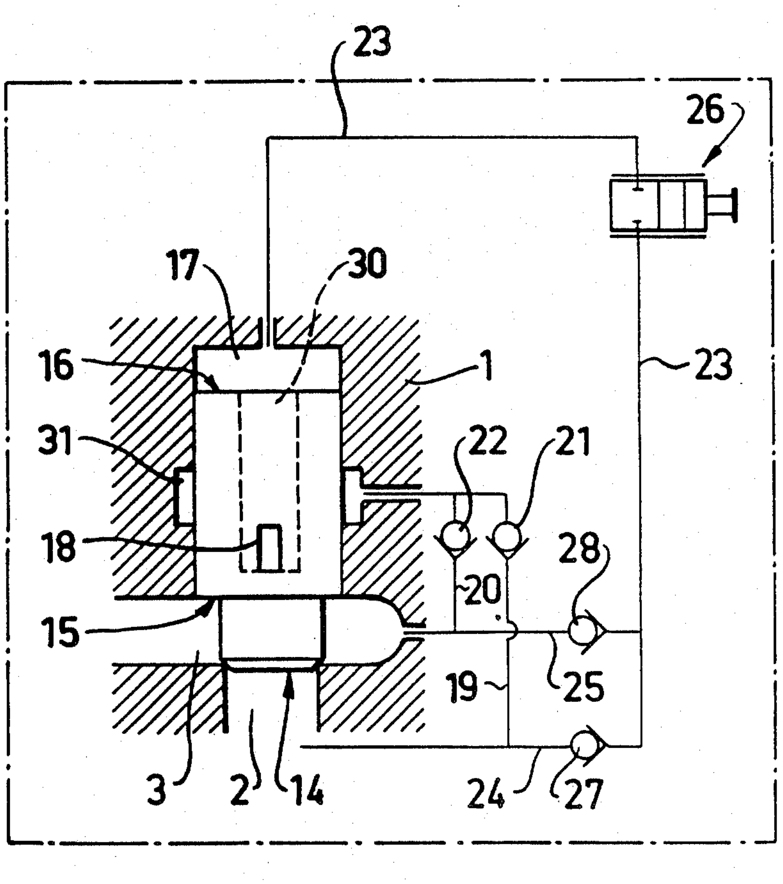

The invention is described in the following in greater detail with reference to the enclosed drawings in which FIG. 1 shows schematically and in the form of a block diagram a valve arrangement according to the invention arranged in a line with pressure medium between pressure source and a consuming device and FIG. 2 shows schematically as well as in the form of blocks also a somewhat modified design of the valve arrangement according to FIG. 1.

The valve arrangement of the invention comprises a valve body 1 with a first valve port 2 and a second valve port which serve alternately as input and output. In the example shown in the drawing the valve port 2 is connected through a line 7 with pressure medium to a pressure source 4 in the form of a pump and also to a tank 5 for pressure medium via an electrically controlled discharge and overflow unit 6 while the valve port 3 is connected through a line 8 for pressure medium to a consuming device 9 which in the example shown in FIG. 1 consists of a telescopic cylinder used as dumping cylinder, the return strokes of which are obtained by an externally acting load marked by the arrow 10 in FIG. 1. In the example shown said discharge and overflow unit 6 comprises an overflow valve 11 and a discharge valve 12 of a kind known per se, the object of the latter being to enable pumping around pressure medium from pump to tank in its open position shown in FIG. 1 and to prevent such a working in its second closed position. The overflow valve 11 is on its part arranged to limit the pressure in the line with pressure medium at closed discharge valve when the pressure therein exceeds a predetermined value by permitting part of the flow of pressure medium from the pressure source 4 to stream back to the tank 5. This discharge and overflow unit contains valve combinations known per se and is no real part of the present invention and can therefore also be replaced by other combinations of valves known per se for obtaining the function required for the intended purpose.

In accordance with the invention a valve cone 13 is arranged within the valve body 1 with a tight fit and movable from a closed position, as shown in FIG. 1, in which the valve cone closes the two valve ports 2 and 3, and to an open position in which the valve ports 2 and 3 are connected with each other, and consequently the pressure source 4 is also connected with the consuming device 9 or the latter with the tank 5 for pressure medium.

The valve cone 13 having a cylindrical form has an end surface 14 closing the valve port 2 and an annular end surface 15 closing the valve port 3, said end surface 15 being spaced from the end surface 14 closing the valve port 2 and which end surfaces 14, 15 have together an area which is equal to the area of the end surface 16 of the valve cone facing away from the pressure medium side, said end surface 16 being in a space 17 formed as a pilot flow chamber in the valve body 1.

In the embodiment according to FIG. 1 a groove 18 serving as a variable restriction is formed in the mantle surface of the valve cone, said groove having a certain connection with the pilot flow chamber 17 in the closed position of the valve cone. This groove 18 is also associated with the valve port 2 through a pilot flow passage 19 made in the valve cone 13, and with the valve port 3 through a pilot flow passage 20 also made in the valve cone 13, each of these passages 19, 20 being provided with a nonreturn valve 21 and 22, respectively, which permit pressure medium to flow from the valve port 2 and the valve port 3, respectively, to the groove 18 serving as a variable restriction and through this to the space 17 but prevent a flow in opposite direction.

The space 17 serving as pilot flow chamber in the valve body 1 is in turn connected with the valve port 2 between the valve cone 13 and the pressure source/pressure medium tank 4, 5 via a pilot flow passage 23 and via a pilot flow passage 23, 25 with the valve port 3 between the valve cone 13 and the consuming device 9. In the pilot flow passage 23 there is arranged a control pilot valve, for instance electrically operated, or a proportional magnet valve 26 which is controlled steplessly between its two end positions, viz. a closed and an open position, and which in the closed position prevents outflow of pressure medium from the space 17. In this way the same pressure will arise in the space 17 as in the valve port 2 or the valve port 3 depending on the fact in which port the pressure is maximal and, more specifically, the same pressure as upstream the valve cone 13 as seen in the direction of flow, i.e. the same pressure as in the valve port 2, 3 operating as input, as the pressure always is higher on the input side than on the output side. This pressure prevailing in the space gives rise to a holding force acting on the end surface 16 of the valve cone which is greater in dependence on the area ratio than the counterdirected pressure dependent on the port 2, 3 operating as input and acting on the end surface 14 and 15, respectively, of the valve cone and which holds the valve cone in closed position in this way as long as the control valve 26 is closed.

The pilot flow passage 23 is in each of its branch passages 24 and 25 provided with a nonreturn valve 27 and 28, respectively, permitting a flow in a direction away from the space 17 and the pilot valve 26 but not in an opposite direction, as is apparent from the drawings.

In the example shown in FIG. 1 the telescopic cylinder 9 is shown in a pushed-out position and in a loaded state meaning that this load serving as a pressure source gives rise to a pressure in the line 8 and, consequently, in the valve port 3 serving as input which pressure is higher than the pressure in the valve port 2 serving as output in this case and in the line 7 which is assumed to be evacuated via the valve 12 to the tank and which pressure, thus, is also prevailing in the space 17 via the passage 20 and the groove 18 and holds the valve cone 13 in its closed position as long as the control pilot valve 26 is closed. When this is opened a pilot flow will arise from the space 17 via the pilot flow passage 23, 24 to a position downstream the valve port serving as output, i.e. the port 2 in this case, and consequently the valve cone 13 is made to move from its closed position and to open the connection through the valve body 1, and the valve cone 13 is then made to move as far from its closed position as required to establish a flow balance between the flow through the valve cone 13 and the flow through the control pilot valve 26. By the stepless control offered by said pilot valve 26 the valve cone 13 is also controlled steplessly between its end positions and a possibility is consequently obtained in this way to control the speed of the telescopic cylinder.

For pushing out the telescopic cylinder 9 against the action of a load the pump 4 is started and as long as the control pilot valve 26 is maintained closed the valve cone 13 is also kept in closed position as the pressure in the valve port 2 serving as input and in the space 17 is the same, and if the pressure in the line 7 and the port 2 increases recirculation to the tank takes place via the discharge and overflow unit 6. When said pilot valve 26 is opened a pilot flwo arises from the space 17 behind the valve cone 13 and to a position downstream the valve port serving as output and this pilot flow causes in the way previously described the valve cone 13 to move from its closed position and to open the valve so that pressure medium can stream through it to the consuming device 9 which is then actuated to carry out its work.

A modified embodiment of the present valve arrangement is shown in FIG. 2 which differs from that shown in FIG. 1 only through the placement of the pilot flow passages 19, 20 which in the embodiment according to FIG. 2 lie outside the very valve cone 13. In the latter example this has a central bore 30 extending so to say into the space 17 behind the valve cone 13 and associated with the groove 18 made as a variable restriction in the mantle surface of the valve cone in the same way as in the embodiment according to FIG. 1. This groove 18 has in turn in the closed position of the valve cone a certain connection with a groove 31 made in the valve body and running all around in which the pilot flow passages 19 and 20 starting from each their valve ports 2 and 3 end. More specifically, in FIG. 2 the pilot flow passages 19 and 20 are shown starting from each of the branch passages 24 and 25 of the pilot flow passage starting from the space 17 behind the valve cone 13 between the nonreturn valves 27, 28 thereof and the respective valve port 2,3. Otherwise this modified embodiment is the same as the embodiment according to FIG. 1 and operates in the same way as this.

This invention is not restricted to what has been described above and shown in the drawings but can be varied, changed and combined in many different manners within the scope of the inventive idea indicated in the claims. This, the control pilot valve 26 can for instance be replaced by a valve of so-called on/off type with two positions and the two nonreturn valves pairs 21, 22 and 27, 28, respectively, can in turn be replaced by reverse valves.

I claim:

1. A valve arrangement comprising: a valve body having a valve cavity, a first valve port and a second valve port, said first valve port being connectable to a fluid pressure source and said second valve port being connectable to a fluid pressure utilization device; a shiftable valve cone in said valve cavity in sealing engagement with the walls thereof and movable between a closed position in which a first side of the cone closes said first and second valve ports and an open position in which said valve ports are in communication with each other, said valve cone having a second side facing way from said first said and forming a space with said valve cavity and said valve cone being urged to its closed position by a fluid pressure holding force in said space; means for passing pressure fluid from said valve ports to said space, said means including a passage corresponding to each valve port and in communication at one end with its respective valve port and in communication at an opposite end with a groove in said valve cone, which groove is common to both passages and is in communication with said space, said groove cooperating with a wall of said cavity so as to serve as a variable restriction to fluid flow through the groove as the valve cone moves, and said groove always being in fluid communication with said space when said valve cone is in both the open and closed positions, each of said passages containing a one-way valve which permits fluid flow only in a direction to said groove; means for passing pressure fluid from said space to said valve ports, said means including a passage corresponding to each valve port and in communication at one end with its respective valve port and in communication at an opposite end with said space, each of said passages containing a one-way valve which permits flow only in a direction out of said space; and a control valve located between said space and said last-named one-way valves for selectively opening and blocking fluid flow from said space to said last-named passages.

2. A valve arrangement as in claim 1 wherein said passages which pass pressure fluid from said valve ports to said space are located in said valve cone, said groove being located in the periphery of said valve cone so as to be in communication with said space and to provide said fluid flow restriction which varies as said valve cone moves in said valve cavity.

3. A valve arrangement as in claim 1 wherein said groove in said valve cone communicates with a central bore in said valve cone, wherein the wall of said valve cavity has a circumferential groove which communicates with said groove in said valve cone so as to provide said fluid flow restriction which varies as said valve cone moves in said valve cavity, and wherein said passages which pass pressure fluid from said valve ports to said space are located in said valve body and are in communication with said groove in said valve body.

4. A valve arrangement as in claim 1 wherein said control valve is a control pilot valve.

5. A valve arrangement as in claim 1 wherein said control valve is a proportional magnet valve which is electrically operable.

* * * * *